US012542129B2

(12) United States Patent
Epstein Koch et al.

(10) Patent No.: US 12,542,129 B2
(45) Date of Patent: Feb. 3, 2026

(54) AUTOMATED VALIDATION OF INFORMATION EXCHANGED DURING INTERACTIONS

(71) Applicant: Verint Americas Inc., Alpharetta, GA (US)

(72) Inventors: Ron Peretz Epstein Koch, Alpharetta, GA (US); Ian Beaver, Alpharetta, GA (US); Dvir Cohen, Netivot (IL)

(73) Assignee: Verint Americas Inc., Alpharetta, GA (US)

( * ) Notice: Subject to any disclaimer, the term of this patent is extended or adjusted under 35 U.S.C. 154(b) by 388 days.

(21) Appl. No.: 18/046,969

(22) Filed: Oct. 17, 2022

(65) Prior Publication Data

US 2024/0127800 A1   Apr. 18, 2024

(51) Int. Cl.
*G10L 15/08* (2006.01)
*G10L 15/02* (2006.01)

(52) U.S. Cl.
CPC ............ *G10L 15/083* (2013.01); *G10L 15/02* (2013.01); *G10L 2015/088* (2013.01)

(58) Field of Classification Search
CPC ..... G10L 15/083; G10L 15/08; G10L 15/142; G10L 15/02; G10L 15/26; G10L 2015/088; G06F 40/20; G06F 16/2379; G06F 16/254; G06F 16/00; G06F 16/215; G06F 21/6245; G06F 21/55; G06F 21/51; G06F 40/30; G06F 40/10; G06F 40/00; G06F 40/40; G06F 18/22; G06F 18/30; G06F 18/10; G06F 18/00; G06F 11/002; G06F 11/004; G06F 11/07; G06F 11/0703; G06F 16/34; G06F 16/38; G06F 16/9038; G06F 21/445; G06F 21/31; G06Q 10/10; G06Q 10/06395; G06Q 40/08; G06Q 40/025; G06Q 50/01; G06Q 30/01; G06Q 30/016; G06Q 30/0201; G06Q 10/06393; G06Q 10/0639; G06Q 20/02; G06Q 20/023; G06Q 20/027; G06Q 30/012; G06Q 30/014; G06Q 30/015; G06Q 10/1093; G06Q 10/06311; G06Q 10/063112; G06N 20/20; G06N 20/00; G05B 19/042; H04L 63/1425; G16H 40/00
USPC ........................................................ 704/1–9
See application file for complete search history.

(56) References Cited

U.S. PATENT DOCUMENTS

| | | |
|---|---|---|
| 8,355,919 B2 | 1/2013 | Silverman et al. |
| 10,592,604 B2 | 3/2020 | Pusateri et al. |
| 2008/0244686 A1* | 10/2008 | Li .......................... G06F 21/565 726/1 |
| 2022/0130398 A1* | 4/2022 | Coman ................... G06F 40/35 |

OTHER PUBLICATIONS

Richard Sproat, Navdeep Jaitly. RNN Approaches to Text Normalization: A Challenge. (2016) https://arxiv.org/ftp/arxiv/papers/1611/1611.00068.pdf.

(Continued)

*Primary Examiner* — Leshui Zhang
(74) *Attorney, Agent, or Firm* — Meunier Carlin & Curfman LLC (57) ABSTRACT

A system including an interaction processing component is deployed to automatically validate information exchanged during an interaction.

12 Claims, 6 Drawing Sheets

(56) References Cited

OTHER PUBLICATIONS

Marcel Bollmann, A Large-Scale Comparison of Historical Text Normalization Systems (2019) https://arxiv.org/pdf/1904.02036.pdf.

Monica Sunkara, Chaitanya Shivade, Sravan Bodapati, Katrin Kirchhoff, Neural Inverse Text Normalization (2021) https://arxiv.org/pdf/2102.06380.pdf.

Jae Hun Ro, Felix Stahlberg, Ke Wu, Shankar Kumar, Transformer-Based Models of Text Normalization for Speech Applications, 2022. https://arxiv.org/pdf/2202.00153.pdf.

Yang Zhang, Evelina Bakhturina, Kyle Gorman, Boris Ginsburg, NeMo Inverse Text Normalization: From Development to Production (2021) https://arxiv.org/pdf/2104.05055.pdf.

* cited by examiner

CLAIM FORM

Customer Name: John Smith

Customer Address: 800 North Po[...] Alpharetta

Phone Number: 770-7[...]

ALERT!
The phone number is incorrect. Please select one of the following options Verify the number with the customer ☐

Flag this form for offline verification ☐

AUTOMATED VALIDATION OF INFORMATION EXCHANGED DURING INTERACTIONS

BACKGROUND

A customer may initiate an interaction (e.g., communication session, phone call, chat) with a customer service contact number and interact with (e.g., speak with or communicate via text) an agent (e.g., customer service representative) who may, in turn, enter user responses into a computing system. These systems and methods are plagued by challenges and limitations relating to the accuracy of the information exchanged during an interaction. For example, an agent may inadvertently enter incorrect data into a computing system or business system or provide inaccurate information. By way of example, a customer may indicate to a customer service representative that he or she is female, and the customer service representative may incorrectly enter (e.g., by typing or selecting a checkbox) that the customer is male. Presently, very few interactions (e.g., calls, chats) between customers and agents can be monitored or validated because the manual review of such interactions is time consuming, labor intensive, and inefficient.

SUMMARY

The present disclosure describes methods and systems for automatically validating information exchanged during interactions between customers and agents or customer service representatives.

In various examples, a customer may call a contact center for assistance (e.g., to arrange mobile device repair, report a service outage, purchase an insurance plan, or the like) and interact with an agent (e.g., customer service representative). During the interaction, the agent may receive and/or request information from the customer and may capture (e.g., enter or type) at least a portion of the information exchanged into a computing system or business system (e.g., via a computing entity, desktop, or mobile device).

By way of example, an insurance agent may ask a customer to provide car information or personal information (e.g., full name, date of birth, and the like). During the interaction, the agent may incorrectly hear and/or input information into a computing system. For example, a customer may say, "I am 35 years old," but an agent may incorrectly type "65" into an age field displayed on his or her screen. In another example, an agent's screen may indicate that an insurance quote is $135 per month, but the agent may incorrectly tell the customer that the insurance quote is $165 per month.

In some cases, an interaction between a customer and an agent may be recorded, and a reviewer may listen to the recording while reviewing stored business information (e.g., via a display screen) in order to verify that the information exchanged between the customer and the agent is accurate. Such manual reviewing processes are inefficient and time consuming. Accordingly, using such systems, very few interactions (e.g., less than 1%) can effectively be validated, verified, and/or monitored.

Accordingly, embodiments of the present disclosure include automated interaction processing systems that are capable of monitoring interactions between customers and agents over a communication channel (e.g., audio call, chat, or the like) to validate that the information being exchanged, input and stored is accurate.

In accordance with the present disclosure, a method for validation of information exchanged during an interaction is provided. The method includes: receiving validation event data at an interaction processing component; receiving content corresponding with an interaction; extracting one or more entities from the content that are associated with a validation event data type corresponding with at least a portion of the validation event data; comparing the one or more entities and the at least a portion of the validation event data; determining whether the at least a portion of the validation event data and the one or more entities match; and in response to determining that the at least a portion of the validation event data and the one or more entities do not match, triggering review operations.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Overview

The present disclosure is directed to an automated interaction processing system that can automatically process input data from a first source (e.g., agent desktop data) and input data from a second (e.g., interaction data, such as a call transcript) and determine whether information exchanged during an interaction matches (e.g., corresponds with) information that is stored (e.g., in a computing system or business system). Interaction data or content may comprise transcribed content from speech-based interactions and/or content from text-based interactions. For example, interaction data can comprise transcriptions, a transcript of a conversation, dialogue, or a chat (e.g., text-based exchange) between a customer and an agent or customer representative. Interaction data may also comprise email or other forms of interaction content. An example agent or customer representative may be associated with service infrastructure such as, but not limited to, a contact center, a business, a service provider, a government agency, a healthcare provider, a financial services organization, a person, or other organization or individual that has a function to interface with its customers or users.

Embodiments of the present disclosure include systems that are configured to automatically validate whether an agent (e.g., customer service representative, assistant, delegate, or the like) correctly conveys complete and correct information to a customer during a customer interaction. Embodiments of the present disclosure include systems that are configured to automatically validate whether an agent correctly processed (e.g., entered) information provided by a customer during a customer interaction.

Embodiments of the present disclosure provide systems that are configured to trigger or initiate review operations in response to identifying (e.g., detecting) that interaction event information does not match stored information. For example, embodiments of the present disclosure may lead to generating or outputting an alert or indication on an agent's desktop and/or tagging a call for manual or offline review. Conversely, if interaction event information matches the stored information, the system may bypass secondary or subsequent review operations. This approach allows an automated interaction processing system to accurately and quickly analyze all of the interactions between users and agents with minimal user input and resources instead of a small percentage that can be manually reviewed using existing techniques.

Embodiments of the present disclosure include systems that can facilitate entry of and monitor information that is entered into a computing system by an agent, referred to herein as a "desktop processing analytic engine." In various embodiments, the desktop processing analytic engine is configured to capture data that is presented on an end-user's desktop screen and/or entered by an end-user (e.g., using a desktop keyboard, mouse, and/or any other input device). In accordance with the present disclosure, a desktop processing analytic engine can be used to capture data entered by an agent in order to validate that the agent correctly entered data that was communicated to the agent by the customer during the interaction. Additionally, the desktop processing analytic engine can be used to capture data displayed to an agent in order to validate that the agent correctly communicated that data to a customer during an interaction. It should be understood that embodiments of the present disclosure are not limited to desktop processing analytic engines as described herein. In various examples, embodiments of the present disclosure may include other systems that are capable of accessing, processing, and/or obtaining data that is presented to and/or entered by an end user, including, but not limited to, other business applications, application programming interfaces (APIs), and/or similar systems that can provide such capabilities.

Embodiments of the present disclosure include automatic speech recognition engine systems that can include semantic analyzer(s) that can determine the semantic meaning of speech. The system can include a sub-system for transcribing speech into text, referred to herein as an "automatic speech recognizer." For example, the automatic speech recognizer can receive an audio file or audio stream from the customer and transcribe that audio stream into text in real time. A speech recognizer can use one or more language models, which can prescribe the way phonemes (e.g., audio) map to morphemes (e.g., text or transcriptions).

Example Environment and Processes

Figure 1:
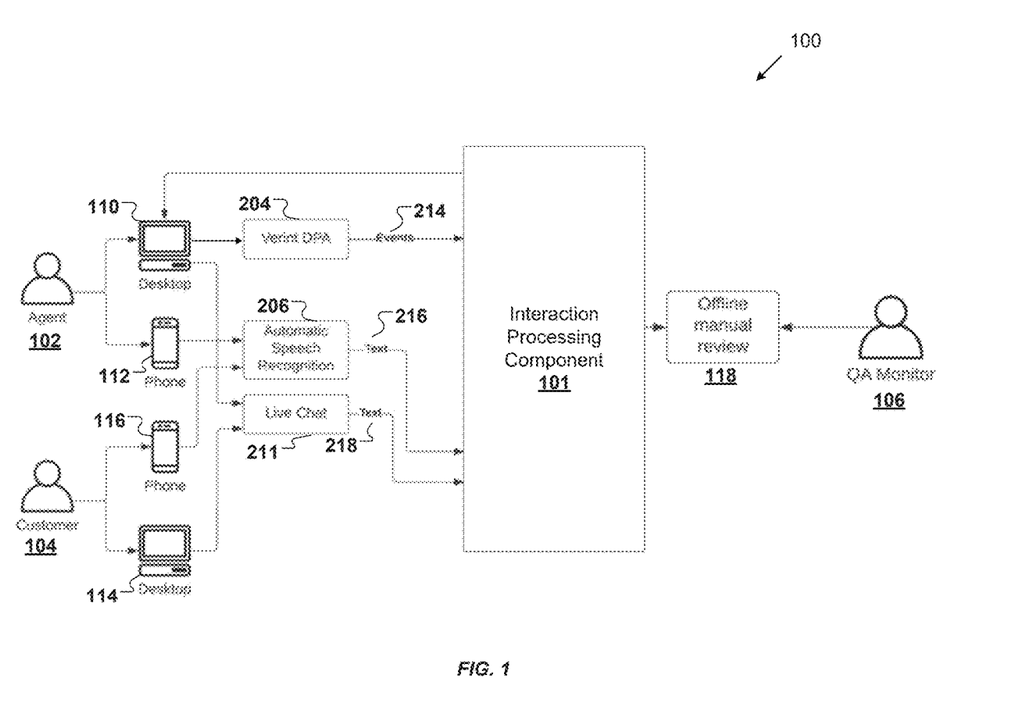
FIG. 1 illustrates a system that can be used to automatically validate information according to certain embodiments.

FIG. 1 illustrates an example overview schematic of a system 100 that implements automated interaction processing in accordance with certain embodiments of the present disclosure.

With reference to FIG. 1, the system 100 can include an interaction processing component 101 that is configured to monitor interactions between customers and agents over a communication channel (e.g., audio call, chat, or the like) to validate that the information being exchanged, input, and/or stored is accurate, as discussed in more detail below.

As depicted in FIG. 1, an agent 102 and a customer 104 may communicate with one another over a communication channel. In particular, as illustrated, agent 102 may communicate via a computing entity 110 (e.g., desktop) or mobile device 112. Similarly, customer 104 may communicate via another computing entity 114 (e.g., desktop) or another mobile device 116. System 100 may comprise a desktop processing analytics engine 204 that can facilitate the entry of information into a computing system. The desktop processing analytics engine 204 may provide (e.g., transmit, send) validation event data 214 to the interaction processing component 101. The validation event data 214 may be or comprise data that is captured (e.g., recorded, inputted, entered, or the like) by an agent and may be related to particular actions being taken by the agent and/or specific events. In some embodiments, validation event data 214 may include a request for validation of information associated with a particular form, field, screen, a validation event data type (e.g., customer name, address), and/or the like. For example, validation event data 214 may relate to or be associated with a particular electronic form or screen (e.g., a claim form, order form, invoice, customer information screen, and the like). Entry of information into a computing system or business system by an agent can trigger the generation of validation event data 214 (e.g., logging of an event). For example, information entered into a claim form may trigger the logging of a validation event and/or generation of validation event data 214 associated with the claim form. In some embodiments, validation event data 214 (e.g., a request for information validation) may be generated in response to (e.g., triggered by) an action taken by a customer. In some examples, validation event data 214 may be triggered by a customer or agent uttering a particular keyword or phrase during an interaction (e.g., conversation, chat). In some embodiments, validation event data 214 can be generated based on one or more stored rules that may be associated with a particular data field or data entity. In various embodiments, validation event data 214 may be generated in real-time (e.g., to alert an agent about an error and prompt the agent to correct the error in the system) or post-interaction (e.g., to identify stored errors after the interaction has concluded).

As further depicted in FIG. 1, system 100 can include an automatic speech recognizer 206 that can use a recognizer language model to process an audio input (e.g., an audio stream from a conversation or interaction between the agent 102 and the customer 104 using mobile devices 112 and 116) and generate content 216 (e.g., transcribed speech output or text). The automatic speech recognizer 206 can also be referred to as an "ASR" and can be used in various telephony applications, including interactive voice response (IVR) systems. In some embodiments, the automatic speech recognizer 206 can be used in conjunction with or comprise a semantic analyzer that can determine the meaning of speech. The automatic speech recognizer 206 can be implemented by a processor and memory (e.g., as a program stored on a computer readable medium). The automatic speech recognizer 206 can also be implemented using a program that is configured to receive audio input and produce transcribed speech outputs (e.g., text or transcriptions). In some embodiments, the automatic speech recognizer 206 can be embodied as a cloud service. Additionally, in some embodiments, the automatic speech recognizer 206 can be implemented via a local server or servers or on an individual computer.

As further depicted in FIG. 1, system 100 can include a text processing component 211 that is configured to directly receive/process a live chat and generate/transmit text 218 (e.g., a live chat from an interaction between the agent 102 and the customer 104 using the computing entities 110 and 114). In some examples, the text processing component 211 may obtain or process text from a text-based channel in real time.

In some embodiments, the operations of the interaction processing component 101 can lead to triggering an offline manual review 118 of data or information that is stored in a computing system or business system, for example, by a quality assurance monitor 106, as depicted in FIG. 1. In some embodiments, the operations of the interaction processing component 101 can lead to generating outputs such as alerts and/or prompts for display to an agent. In other examples, the operations of the interaction processing component 101 can lead to the automatic correction of stored data that contains errors. For example, the interaction processing component 101 can obtain text 218 from a text processing component 211 (e.g., text-based chat or interaction) that can be used as ground-truth data to automatically update or correct stored data and/or data that is entered by an agent.

Embodiments of the present disclosure can, in response to receiving an indication of an event being logged, verify whether interaction data (e.g., from an audio stream or text from a chat) matches or corresponds with stored information. Accordingly, embodiments of the present disclosure may be used to efficiently ensure that all information that is stored in a computing system or business system is accurate and up-to-date. By performing operations in response to receiving validation event data (e.g., detected events or requests), embodiments of the present disclosure further facilitate the optimal allocation of and use of computing resources for such operations. For example, in certain embodiments, data entry (e.g., into certain entry forms) by an agent via a desktop can trigger monitoring operations by an interaction processing component for a predetermined time period or until the agent switches to a different activity or state (e.g., closes the entry form). In other words, there is no need to continuously monitor or review an entire interaction between a customer and an agent.

In accordance with certain embodiments, one or more of the components of FIG. 1 may be implemented using cloud services to process audio inputs, live chat, text and/or transcriptions, and other processes described above. For example, the components shown in FIG. 1 may be in the same or different cloud service environments and may communicate with each other over one or more network connections, such as a LAN, WAN, Internet, or other network connectivity. In such embodiments, automatic speech recognizer 206 or text processing component 211 can be implemented within a cloud services environment to receive audio inputs in order to transcribe speech. Responsive or subsequent to transcribing the speech, the automatic speech recognizer 206 or text processing component 211 can provide transcribed speech outputs or text (e.g., content 216 or text 218) to the interaction processing component 10, implemented in the same or different cloud services environment, over the network connection. An example desktop processing analytics system can use the outputs generated by the interaction processing component 101 to automatically update (e.g., correct) stored information, provide alerts, and/or trigger a manual review of a particular interaction (e.g., recorded call or transcript). It should be understood that embodiments of the present disclosure using cloud services can use any number of cloud-based components or non-cloud-based components to perform the processes described herein.

Figure 2:
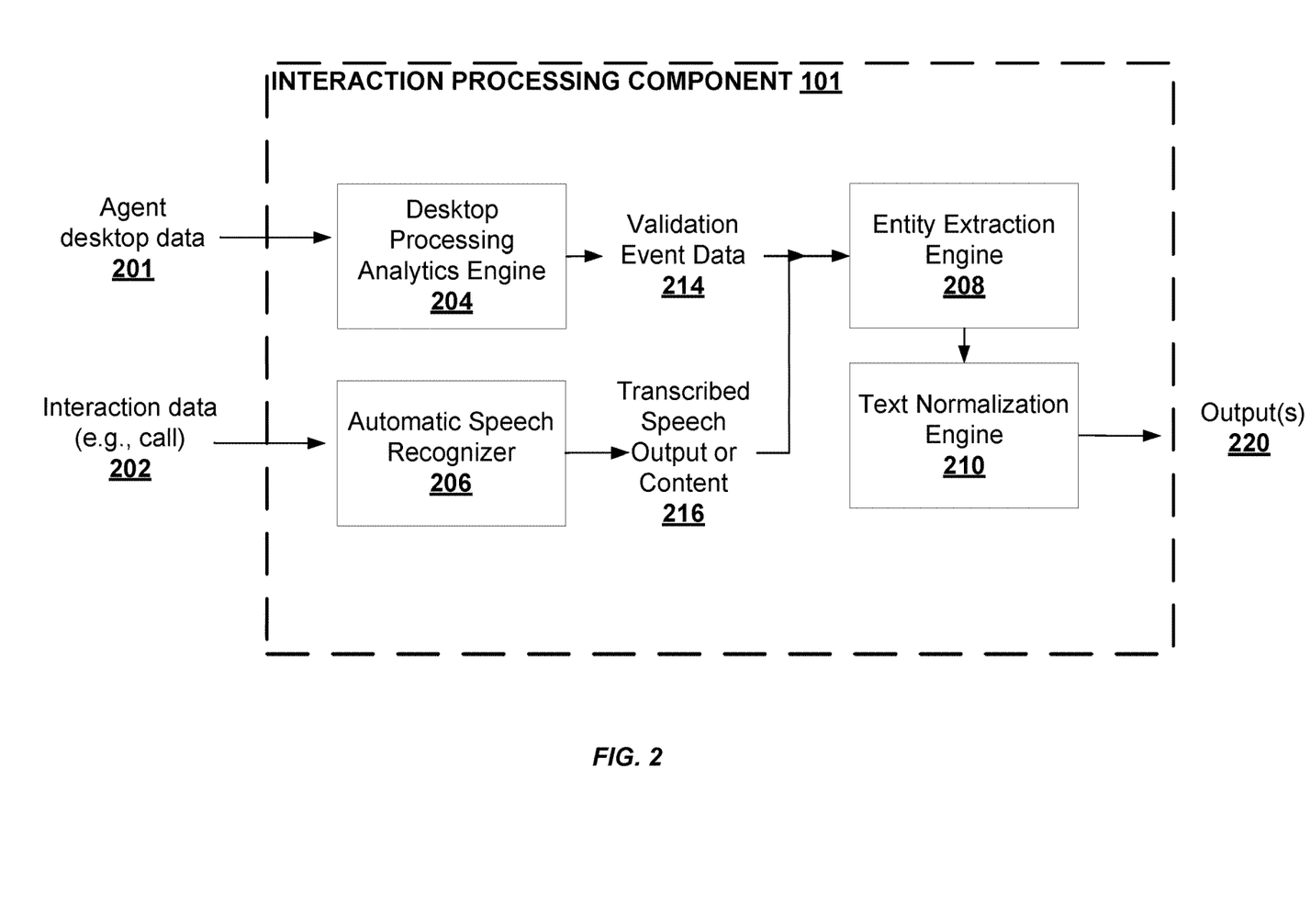
FIG. 2 illustrates an example interaction processing component that can be used to automatically validate information according to certain embodiments.

Referring now to FIG. 2, an example overview schematic of an interaction processing component 101 in accordance with certain embodiments of the present disclosure.

As depicted in FIG. 2, the interaction processing component 101 comprises a desktop processing analytics engine 204, an automatic speech recognizer 206, an entity extraction engine 208, and a text normalization engine 210. While FIG. 2 provides an example interaction processing component 101, it is noted that the scope of the present disclosure is not limited to the example shown in FIG. 2. In some examples, a system in accordance with the present disclosure may comprise a separate or remote desktop processing analytics engine 204 and/or one or more separate or remote automatic speech recognizers 206.

In various embodiments, the desktop processing analytics engine 204 can process agent desktop data 201 and generate validation event data 214, which can be used by the interaction processing component 101. As noted above, in some examples, the validation event data 214 can comprise data that is captured by an agent that relates to particular actions and/or events. In some embodiments, the validation event data 214 includes or comprises a validation request with respect to a particular data entry, data object, or the like (e.g., one or more fields in a form). As further depicted, the automatic speech recognizer 206 can process interaction data 202 and generate content (e.g., content 216, such as a transcribed speech output and/or text 218 discussed above in connection with FIG. 1).

As noted above, the interaction processing component 101 can be configured to monitor and/or review interactions (e.g., between customers and agents over a communication channel) and validate that information being exchanged, captured, and stored is accurate. In particular, the operations of the interaction processing component 101 can lead to generating output(s), such as output(s) 220 depicted in FIG. 2, and/or triggering review operations. In some embodiments, the output(s) 220 may be or comprise data objects that can be used to generate user interface data (e.g., alerts) or used to automatically modify or correct stored information without user input. For an ongoing call, an output 220 may comprise a flag or tag to prompt secondary review (e.g., manual review) of a particular form or entry.

As noted above and as illustrated in FIG. 2, the interaction processing component comprises an entity extraction engine 208. In various embodiments, the entity extraction engine 208 is configured to extract one or more entities or objects content (e.g., content 216). For example, if an agent says, "tell me your phone number," the customer may provide a phone number in response, for example, "770-754-1900." In the above example, the entity extraction engine 208 may extract a data item and an object associated with the data item, such as <phone number/7707541900>, from a transcript of the interaction or other form of interaction content.

As further depicted in FIG. 2, the interaction processing component 101 comprises a text normalization engine 210 that can be used to compare data collected from two different sources (e.g., a transcribed speech output/content and agent desktop data). The text normalization engine 210 may use Inverse Text Normalization (ITN) methods to normalize the data to a common format in order to facilitate comparison (e.g., from a written form to a verbalized form). By way of example, using an ITN method, the text normalization engine 210 may convert the text "three hundred and forty-five" to "345." In some examples, the text normalization engine 210 may normalize text by removing special characters (e.g., hyphens). For example, the text normalization engine 210 may convert the text "(770)-754-1900" to "7707541900". Subsequent to processing or normalizing data from different sources, the text normalization engine 210 can compare them to determine whether or not they are identical. In some embodiments, the text normalization engine 210 may be part of an ASR (e.g., automatic speech recognizer 206) or an ASR pipeline.

Figure 3A:
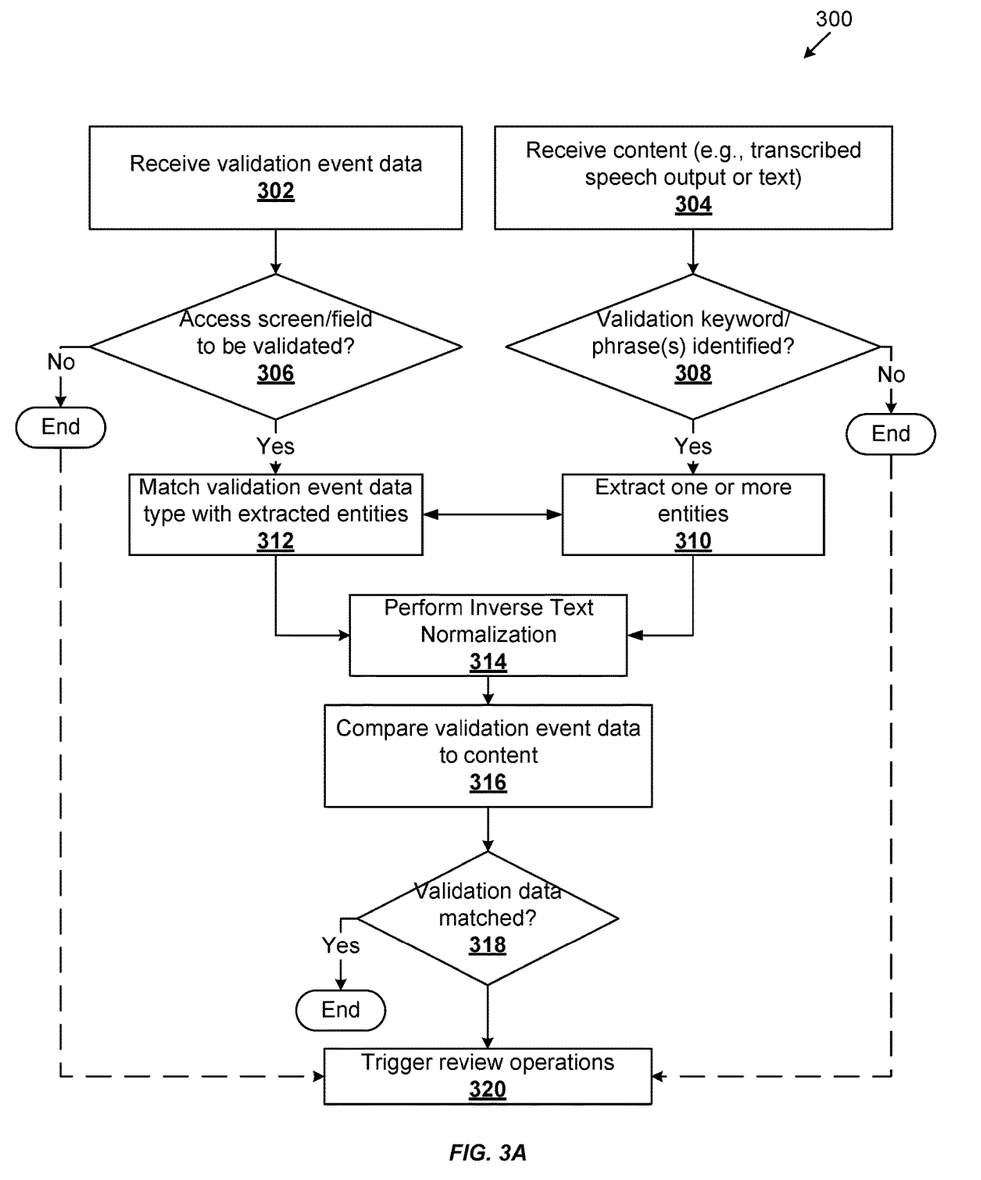
FIG. 3A illustrates an example flow diagram of operations according to certain embodiments.
Figure 3B:
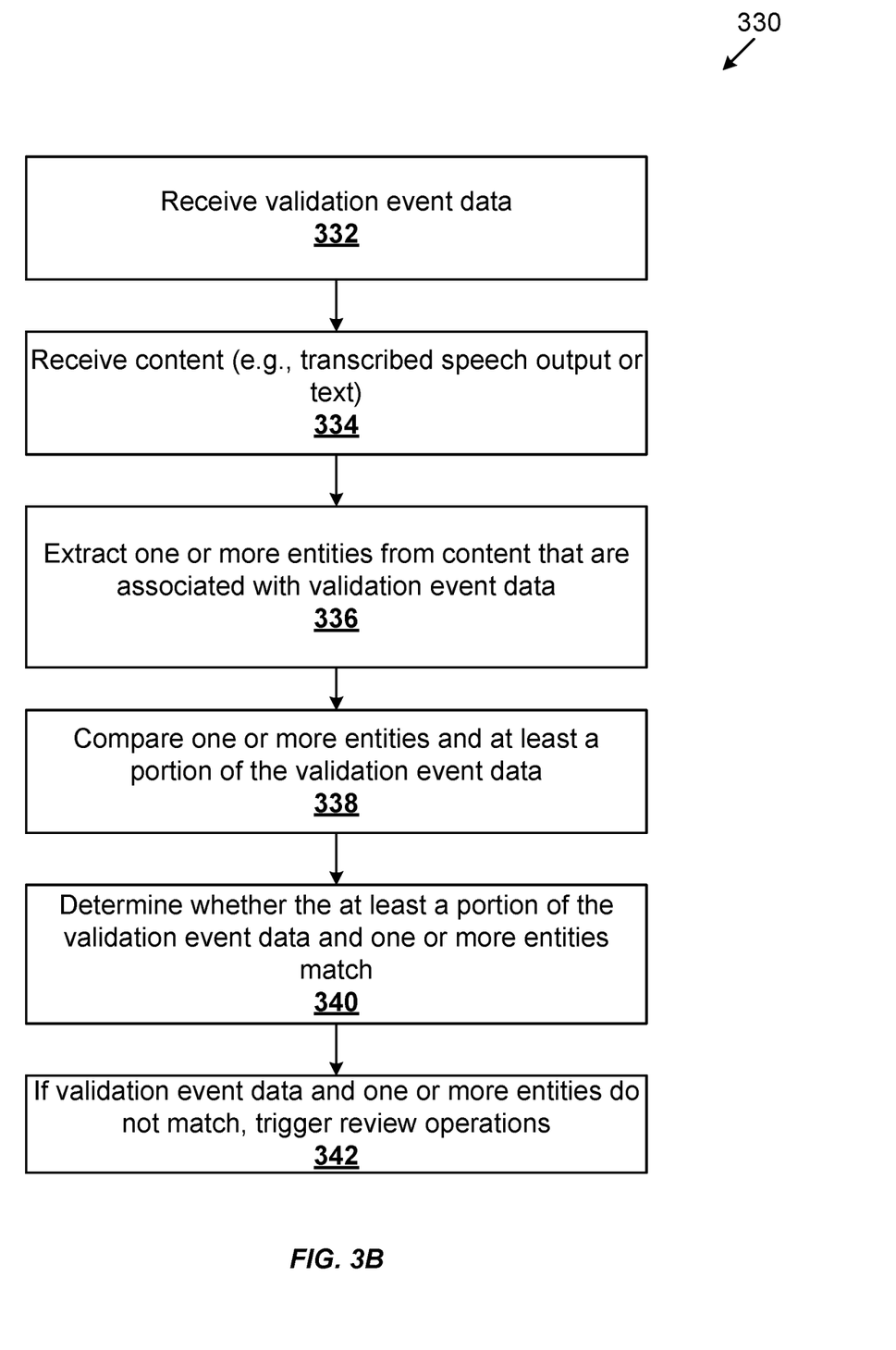
FIG. 3B illustrates an example flow diagram of operations according to certain embodiments.

With reference to FIG. 3A and FIG. 3B, embodiments of the present disclosure include operations for automatically validating data from at least two different sources (e.g., validation event data from stored information and a transcribed speech output, content, or text from a communication channel) using an interaction processing component. Method 300 is illustrated in FIG. 3A and FIG. 3B can be implemented using some or all of the system components illustrated with reference to FIG. 1 and FIG. 2.

Referring now to FIG. 3A, a flow diagram 300 of operations performed by the interaction processing component in accordance with some embodiments discussed herein is provided.

At block 302, an interaction processing component (e.g., interaction processing component 101) which can comprise an entity extraction engine (such as but not limited to, the entity extraction engine 208 illustrated in FIG. 2), receives validation event data. The validation event data can be related to particular actions being taken by the agent, customer, and/or specific events (e.g., data entry into a particular data field or form, the utterance of a keyword or phrase) is received. As noted above, the validation event data may be provided by a desktop processing analytics engine (e.g., desktop processing analytics engine 204) that is configured to monitor data/information that is entered into a computing system or business system (e.g., by an agent). In some embodiments, the validation event data comprises a validation request that is triggered based at least in part on a specific event that may, in turn, be associated with a stored rule (e.g., review all claim forms, review all numerical entries).

At block 304, the interaction processing component receives a transcribed speech output (e.g., from an automatic speech recognizer 206), content, or text. As described with reference to FIG. 1, the automatic speech recognizer can perform speech recognition based on one or more recognizer language models.

At block 306, the interaction processing component can process the validation event data (e.g., using the entity extraction engine 208) and determine whether it can access a screen or field that needs to be validated. At block 306, if the interaction processing component cannot access the screen or field to be validated, method 300 may end. Alternatively, in some embodiments, method 300 proceeds to block 320, where the interaction processing component triggers review operations.

At block 308, the interaction processing component (e.g., automatic speech recognizer 206) processes the transcribed speech output, content, or text to identify one or more validation keywords or phrases that are associated with the validation event data. By way of example, a validation keyword or phrase may be or comprise "phone number," "order," or "address." If the interaction processing component determines that no validation keyword or phrase is present in the transcribed speech output, content, or text, then method 300 ends. Alternatively, in some embodiments, method 300 proceeds to block 320, where the interaction processing component triggers review operations (e.g., flags a call for manual review).

At block 310, in response to identifying one or more validation keywords or phrases, the interaction processing component (e.g., entity extraction engine 208) extracts one or more entities from the transcribed speech output, content, or text. If the validation phrase is "phone number," the interaction processing component may extract at least one number or numerical string, for example, "7707541900."

At block 312, the interaction processing component matches a validation event data type associated with the validation event data (e.g., generated based on agent desktop data) with one or more extracted entities (e.g., extracted from a transcript of a transcript between the agent and a customer). In the above example, the interaction processing component can associate the validation phrase or validation event data type, "phone number" with the number "7707541900." In another example, a validation event data type may be "customer name", and the interaction processing component can determine that a name or phrase uttered during a given interaction (e.g., "John Smith") is a candidate customer name.

At block 314, the interaction processing component, which can comprise a text normalization engine (e.g., text normalization engine 210), can perform Inverse Text Normalization on data from at least two sources (e.g., agent desktop data and a transcribed speech output, content, or text). For example, if an agent types a number into a phone number data field, this may trigger the logging of a validation event that is forwarded to the interaction processing component. In some examples, the interaction processing component may extract the validation event data type ("phone number") and the string entered by the agent ("7707541900"). Additionally, the interaction processing component can extract one or more entities from a content (e.g., a transcribed speech output) describing an interaction between the agent and a customer (e.g., the same number "(770)-754-1900"). In some embodiments, at least one of the numbers (e.g., entered by the agent or extracted from the content or transcribed speech output) may be in a different form. For example, at least one of the numbers may comprise special characters, spaces, or the like. In another example, one of the numbers may be in a verbalized form (e.g., "seven seven oh, seven five four, one nine hundred"). Thus, the text normalization engine may normalize the data from both sources in order to facilitate a comparison between them.

At block 316, the interaction processing component can compare the validation event data to the content, such as a transcribed speech output or text (e.g., the data entered by the agent with the entity or object extracted from the content). For example, the interaction processing component can compare two normalized phone numbers, addresses, names, prices, dates, and the like.

At block 318, the interaction processing component determines whether the validation event data and the transcribed speech output, content, or text (e.g., two normalized numerical strings) match. If the interaction processing component determines that the data matches (e.g., the normalized numerical strings are identical), then method 300 ends. However, if the interaction processing component determines that the validation event data does not match the transcribed speech output, content, or text (e.g., the normalized numerical strings are not identical), then method 300 proceeds to block 320.

At block 320, in response to determining that the validation event data does not match the transcribed speech output, content, or text, the interaction processing component triggers review operations. For example, the interaction processing component can generate or output an alert or indication on an agent's desktop and/or tag a call for manual or offline review. In some embodiments, the interaction processing component can automatically update the incorrect data entry with the correct information.

The present disclosure contemplates that the operations depicted in FIG. 3A can be performed repeatedly (i.e., iteratively) any number of times as a desktop analytics processing engine provides or requests validation event data in response to requests or detected events (e.g., opening of a particular form, utterance of a keyword or phrase).

Referring now to FIG. 3B, a flow diagram 330 of operations performed by an interaction processing component in accordance with some embodiments discussed herein is provided.

At block 332, an interaction processing component (e.g., interaction processing component 101) receives validation event data. The validation event data can comprise a validation request that is triggered based at least in part on a specific event that may, in turn, be associated with a stored rule (e.g., review all claim forms).

At block 334, the interaction processing component receives content (e.g., a transcribed speech output or text).

At block 336, the interaction processing component extracts one or more entities from the content (e.g., transcribed speech output or text) that are associated with the validation event data. For example, the interaction processing component can extract keywords, phrases, strings, combinations thereof, and/or the like. The validation event data may be associated with a particular validation event data type, such as a customer name, username, address, or the like. For example, if the validation event data type is a customer name, the interaction processing component may extract a name or at least one candidate name from the content (e.g., "John Smith").

At block 338, the interaction processing component compares the one or more extracted entities and at least a portion of the validation event data (e.g., information stored in association with a validation event data type, data entry, or field). By way of example, the validation event data type may be "address" and the associated address may be "800 N. Point Parkway, Alpharetta, Georgia 30005." Additionally, the extracted entity may be "800 North Point Pkwy, Alpharetta." Accordingly, the interaction processing component compares the validation event data ("800 N. Point Parkway, Alpharetta, Georgia 30005") and the extracted entity ("800 North Point Pkwy, Alpharetta".)

At block 340, the interaction processing component determines whether the validation event data and the one or more extracted entities match. As discussed above, the interaction processing component may, in some examples, perform Inverse Text Normalization on data from the at least two sources (e.g., validation event data from an agent desktop and content from a communication channel) to facilitate comparison.

At block 342, if the validation event data and the one or more entities do not match, the interaction processing component triggers review operations. For example, the interaction processing component can generate or output an alert or indication on an agent's desktop and/or tag a call for manual or offline review. As noted herein, in some embodiments, the interaction processing component can automatically update the incorrect data entry with the correct information.

Figure 4:
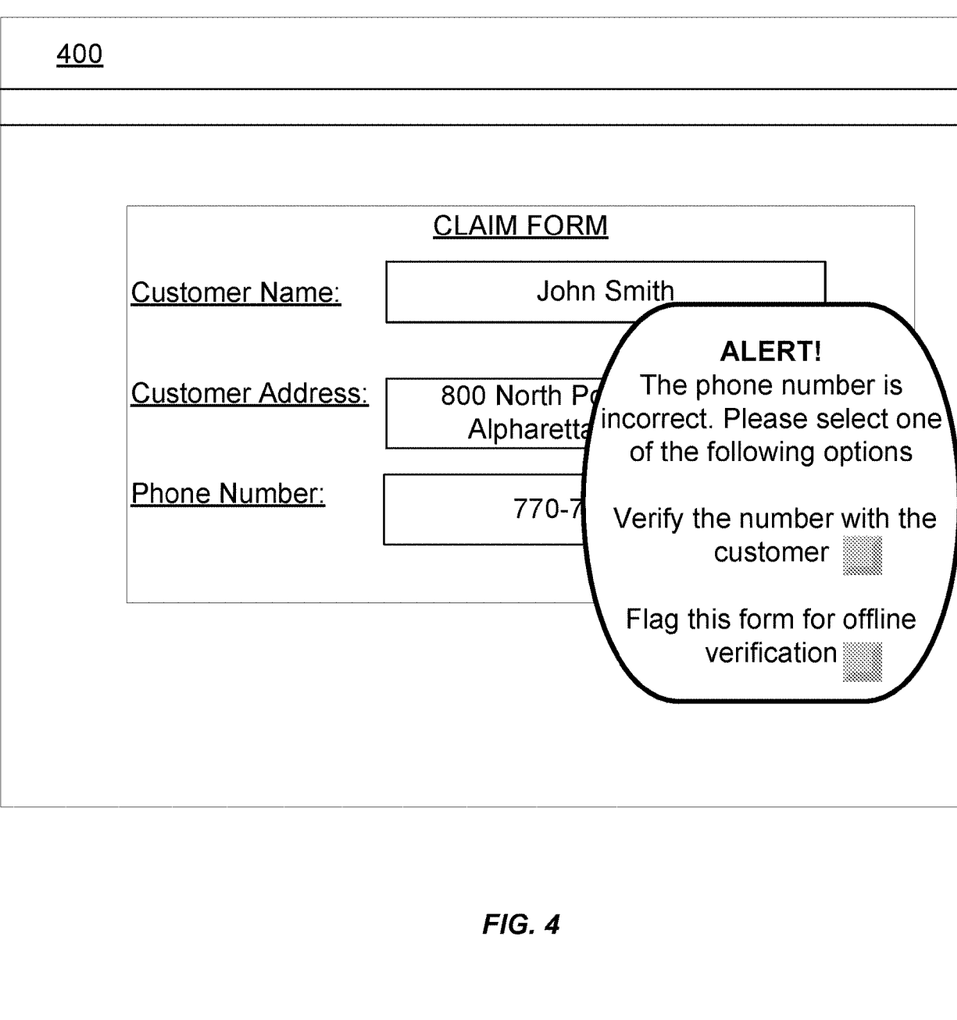
FIG. 4 illustrates an operational example of a user interface according to certain embodiments.

With reference to FIG. 4, an operational example of a user interface in accordance with certain embodiments of the present disclosure is shown. The interaction processing component may generate alerts or notifications in response to determining that information that has been captured and stored is incorrect. The interaction processing component can generate and provide one or more data objects corresponding with an alert or notification for presentation by a computing entity (e.g., agent desktop). In the example depicted in FIG. 4, the user interface 400 of the computing entity (e.g., agent desktop) provides an alert indicating, "The phone number is incorrect. Please select one of the following options." Additionally, as depicted, the user interface 400 may prompt the user (e.g., agent) to update or correct the incorrect information (as depicted, "verify the number with the customer" or "flag the form for offline verification"). In some embodiments, the interaction processing component can tag a data entry or entity (e.g., form or call) for offline verification without alerting an agent. As will be recognized, a variety of approaches and methods can be used to adapt to various needs and circumstances.

Figure 5:
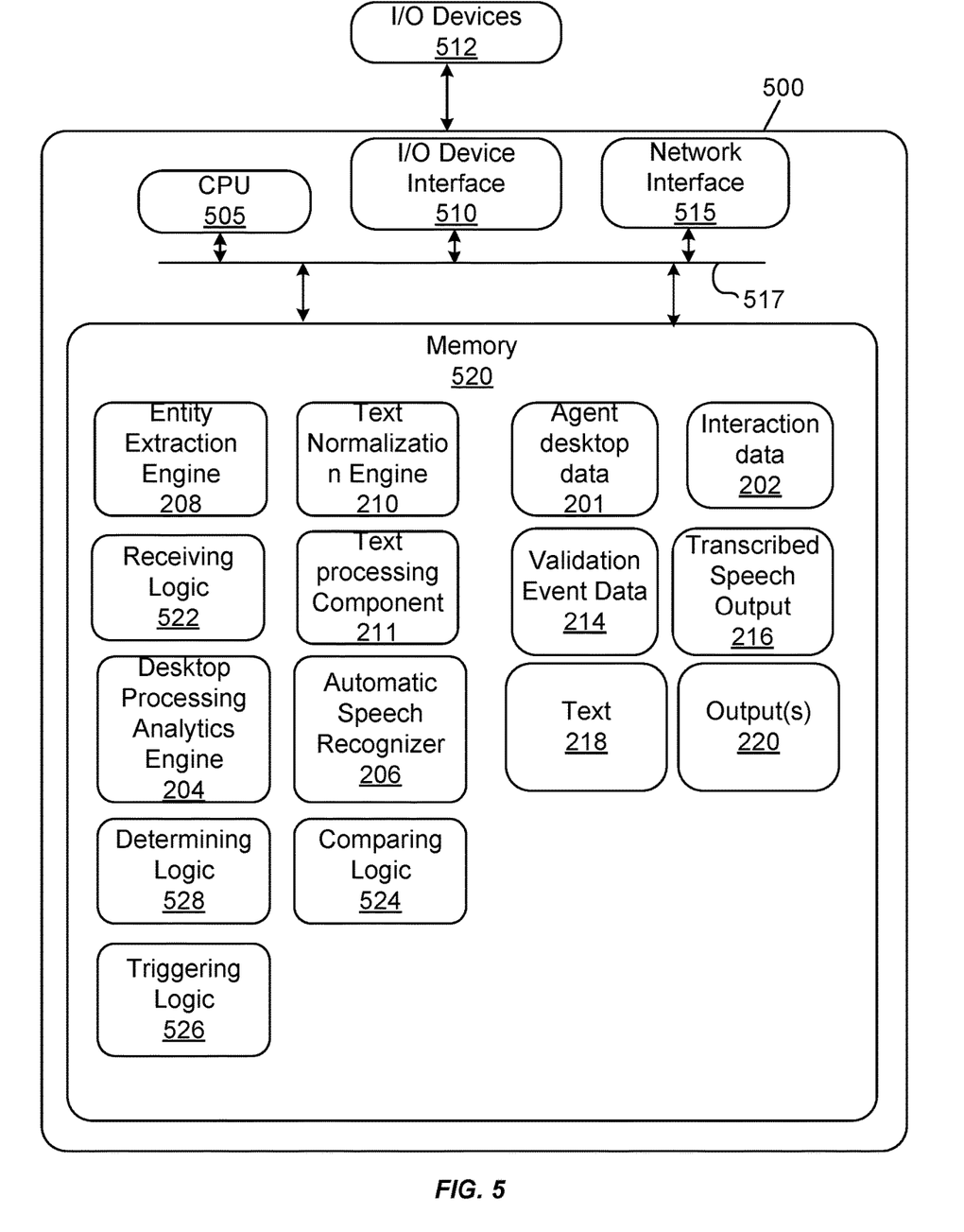
FIG. 5 illustrates example computing systems that may be utilized according to certain embodiments.

FIG. 5 illustrates an example of a computer system 500 that may include the kinds of software programs, data stores, and hardware according to certain embodiments. As shown, the computing system 500 includes, without limitation, a central processing unit (CPU) 505, a network interface 515, and a memory 520, each connected to a bus 517. The computing system 500 may also include an I/O device interface 510 connecting I/O devices 512 (e.g., keyboard, display, and mouse devices) to the computing system 500. Further, the computing elements shown in computing system 500 may correspond to a physical computing system (e.g., a system in a data center) or may be a virtual computing instance executing within a computing cloud.

The CPU 505 retrieves and executes programming instructions stored in memory 520. The bus 517 is used to transmit programming instructions and application data between the CPU 505, I/O device interface 510, network interface 515, and memory 520. Note CPU 505 is included to be representative of a single CPU, multiple CPUs, a single CPU having multiple processing cores, and the like, and the memory 520 is generally included to be representative of random-access memory. The memory 520 may also be a disk drive or flash storage device. Although shown as a single unit, the memory 520 may be a combination of fixed and/or removable storage devices, such as fixed disc drives, removable memory cards, optical storage, network-attached storage (NAS), or a storage area network (SAN).

Illustratively, the memory 520 includes an entity extraction engine 208, a text normalization engine 210, a text processing component 211, a receiving logic 522 (e.g., configured to receive validation event data), a comparing logic 524 (e.g., configured to compare one or more entities and at least a portion of the validation event data), triggering logic 526 (e.g., configured to trigger review operations), and determining logic 528 (e.g., configured to determine whether the at least a portion of the validation event data and the one or more entities match). In some embodiments, the memory 520 also includes a desktop processing analytics engine 204 and an automatic speech recognizer 206.

Further, memory 520 includes the agent desktop data 201, interaction data 202, validation event data 214, content 216, text 218, and output(s) 220, all of which are also discussed in greater detail above.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment. For example, the components described herein can be hardware and/or software components in a single or distributed system, or in a virtual equivalent, such as a cloud computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for validation of information exchanged during an interaction, the method comprising:
    receiving validation event data at an interaction processing component, wherein the validation event data comprises one or more keywords or phrases provided by a customer and entered by an agent into a computing system during the interaction between the customer and the agent, and further wherein the validation event data is generated in response to the agent entering the one or more keywords or phrases into the computing system;
    receiving a content corresponding with the interaction, wherein the content is generated by an automatic speech recognizer and comprises a transcript of the interaction between the customer and the agent;
    extracting one or more entities from the content that are associated with a validation event data type corresponding with at least a portion of the validation event data; one
    comparing the one or more entities and the at least one portion of the validation event data;
    determining whether the at least one portion of the validation event data and the one or more entities match, wherein the determination indicates whether or not the agent correctly entered the one or more keywords or phrases of the validation event data into the computing system during the interaction; and
    in response to determining that the at least one portion of the validation event data and the one or more entities do not match, updating the one or more keywords or phrases in the computing system to match the one or more entities.

2. The method of claim 1, wherein comparing the one or more entities and the at least one portion of the validation event data comprises performing Inverse Text Normalization operations.

3. The method of claim 1, wherein the validation event data further comprises a validation event type.

4. The method of claim 1 wherein triggering review operations comprises one or more of outputting at least one of an alert or message to a computing entity and flagging a call or data entry for manual review.

5. A computer system for validating information exchanged during an interaction, the computer system comprising:
    a processor; and
    a memory operably coupled to the processor, the memory having computer-executable instructions stored thereon that, when executed by the processor, causes the computer system to:
    receive validation event data at an interaction processing component, wherein the validation event data comprises one or more keywords or phrases provided by a customer and entered by an agent into a computing system during the interaction between the customer and the agent;
    receive a content corresponding with the interaction, wherein the content is generated by an automatic speech recognizer and comprises a transcript of the interaction between the customer and the agent;
    extract one or more entities from the content that are associated with a validation event data type corresponding with at least one portion of the validation event data;
    compare the one or more entities and the at least one portion of the validation event data;
    determine whether the at least one portion of the validation event data and the one or more entities match, wherein the determination indicates whether or not the agent correctly entered the one or more keywords or phrases of the validation event data into the computing system during the interaction; and
    in response to determining that the at least one portion of the validation event data and the one or more entities do not match, update the one or more keywords or phrases in the computing system to match the one or more entities.

6. The computer system of claim 5, wherein the computer-executable instructions further include instructions to cause the processor to compare the one or more entities and the at least one portion of the validation event data by:
    performing Inverse Text Normalization operations.

7. The computer system of claim 5, wherein the validation event data further comprises a validation event type.

8. The computer system of claim 5, wherein triggering review operations comprises one or more of outputting at least one of an alert or message to a computing entity and flagging a call or data entry for manual review.

9. A non-transitory computer readable medium comprising instructions that, when executed by a processor of a processing system, cause the processing system to perform a method for processing an interaction, comprising instructions to:

receive validation event data at an interaction processing component, wherein the validation event data comprises one or more keywords or phrases provided by a customer and entered by an agent into a computing system during the interaction between the customer and the agent, and further wherein the validation event data is generated in response to the agent entering the one or more keywords or phrases into the computing system;

receive a content corresponding with the interaction, wherein the content is generated by an automatic speech recognizer and comprises a transcript of the interaction between the customer and the agent;

extract one or more entities from the content that are associated with a validation event data type corresponding with at least a portion of the validation event data; one compare the one or more entities and the at least one portion of the validation event data;

determine whether the at least one portion of the validation event data and the one or more entities match, wherein the determination indicates whether or not the agent correctly entered the one or more keywords or phrases of the validation event data into the computing system during the interaction; and in response to determining that the at least one portion of the validation event data and the one or more entities do not match, update the one or more keywords or phrases in the computing system to match the one or more entries.

10. The non-transitory computer readable medium of claim 9, wherein the instructions further include instructions to cause the processor to compare the one or more entities and the at least one portion of the validation event data by:
performing Inverse Text Normalization operations.

11. The non-transitory computer readable medium of claim 9, wherein the validation event data further comprises a validation event type.

12. The non-transitory computer readable medium of claim 9, wherein triggering review operations comprises one or more of outputting at least one of an alert or message to a computing entity and flagging a call or data entry for manual review.

* * * * *